D. D. GETMAN.
LOW AIR PRESSURE SIGNAL.
APPLICATION FILED MAY 1, 1919.
1,325,012.
Patented Dec. 16, 1919.
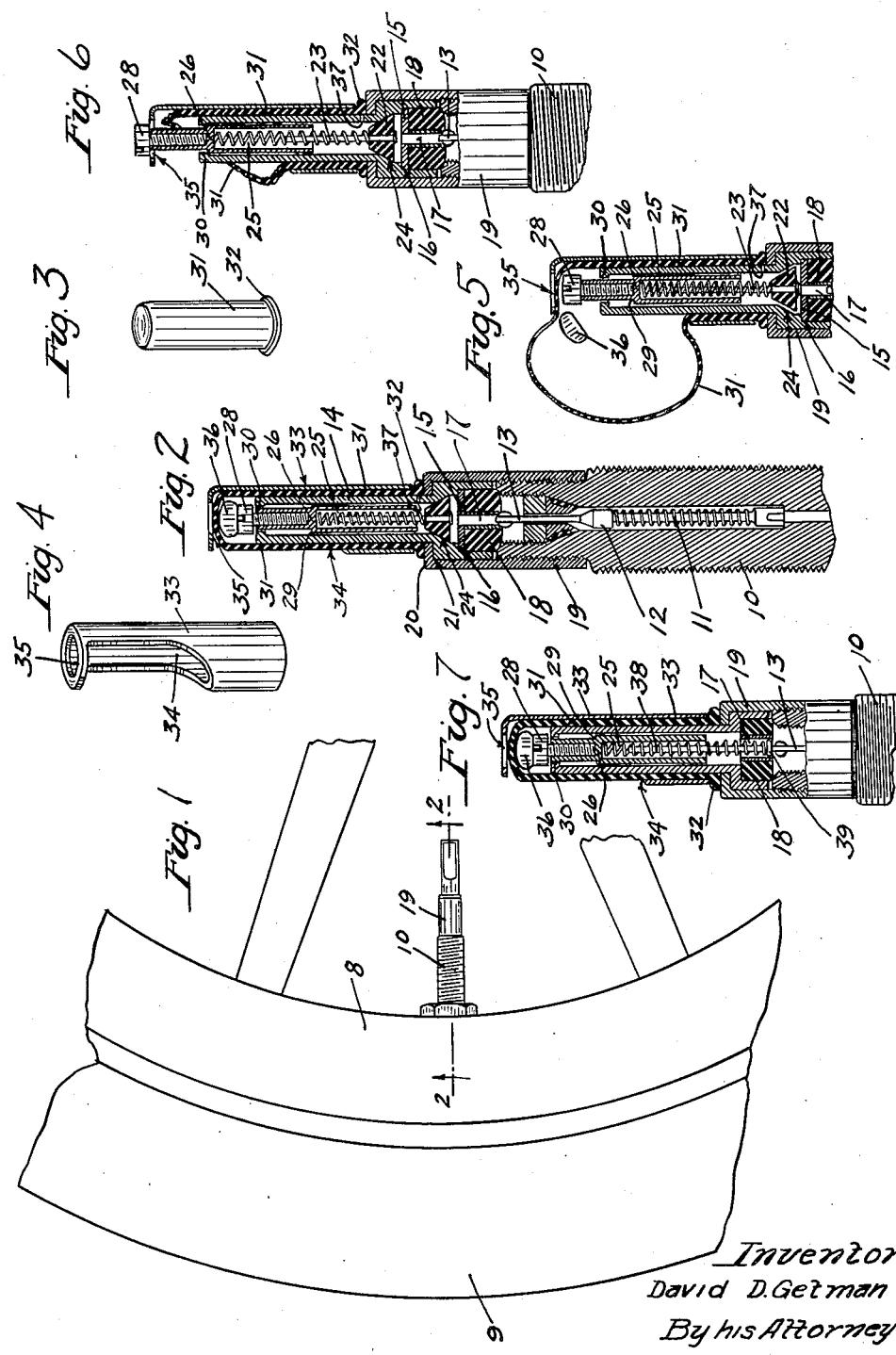
Inventor
David D. Getman
By his Attorneys

UNITED STATES PATENT OFFICE.

DAVID D. GETMAN, OF WHITE BUTTE, SOUTH DAKOTA.

LOW-AIR-PRESSURE SIGNAL.

1,325,012.   Specification of Letters Patent.   Patented Dec. 16, 1919.

Application filed May 1, 1919. Serial No. 294,011.

*To all whom it may concern:*

Be it known that I, DAVID D. GETMAN, a citizen of the United States, residing at White Butte, in the county of Perkins and State of South Dakota, have invented certain new and useful Improvements in Low-Air-Pressure Signals; and I do hereby declare the following to be a full, clear, and exact description of the invention, such as will enable others skilled in the art to which it appertains to make and use the same.

My present invention has for its object to provide a highly efficient low air pressure signal intended for general use, but especially adapted for use in connection with each pneumatic tire of a motor-propelled vehicle, to warn the driver of the vehicle when one of the tires is under-inflated.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a fragmentary view of a pneumatic tire-equipped vehicle wheel having the invention applied to the valve stem of the tire;

Fig. 2 is a view principally in section taken on the line 2—2 of Fig. 1, on an enlarged scale;

Fig. 3 is a perspective view of the explodable bag;

Fig. 4 is a perspective view of the cap for the explodable bag;

Fig. 5 is a view corresponding to Fig. 2, with the exception that the auxiliary valve is open and the explodable bag expanded;

Fig. 6 is a view corresponding to Fig. 5, with the exception that the explodable bag has been exploded and the auxiliary valve closed; and Fig. 7 is a view corresponding to Fig. 2, but showing a slight modification.

The numeral 8 indicates a vehicle wheel having mounted thereon a pneumatic tire, indicated as an entirety by the numeral 9, with the exception of its valve stem 10. Within the valve stem 10, is the customary valve core indicated, as an entirety, by the numeral 11, with the exception of the valve 12 and its guide rod 13, the outer end of which is expanded.

Referring now in detail to the invention, as shown in Figs. 1 to 6, inclusive, the numeral 14 indicates a valve stem extension having an internal annular shoulder 15 on which is seated a washer 16, having a short inwardly projecting tube 17 that extends axially therethrough. A pliable packing 18 is compressed between the washer 16 and outer end of the valve stem 10 and through which packing said tube 17 extends axially.

The valve stem extension 14 is detachably secured to the valve stem 10 by a coupling sleeve 19 having screw-threaded engagement with said valve stem and provided with an inturned annular flange 20 which rests upon a correspondingly formed shoulder 21 on said valve stem extension. Obviously, the packing 18 affords an air-tight joint between the valve stem 10 and its extension 14. When the valve stem extension 14 is attached to the valve stem 10, the lower end of the tube 17 engages the expanded end of the valve rod 13 and holds the valve 12 open to permit a free passage of air from the valve stem 10 into the valve stem extension 14 through the tube 17.

Within the valve stem extension 14, is an auxiliary valve 22 having an outwardly projecting guide rod 23 and arranged to be held against a seat 24 in said valve stem extension by the air pressure in the tire 9. A tubular plunger 25, having a transverse partition 26, is loosely mounted in the valve stem extension 14, outward of the auxiliary valve 22, to permit a free passage of air between said plunger and valve stem extension. The valve rod 23 extends loosely into the inner end portion of the plunger 25 and a coiled spring 27, encircling said rod, is arranged to be compressed between the auxiliary valve 22 and the partition 26. A screw 28, having a relatively large head, has screw-threaded engagement with the outer end portion of the plunger 25, and which screw makes the plunger longitudinally adjustable.

On the plunger 25, at its partition 26, is an external annular shoulder 29 arranged to engage an internal annular shoulder 30 on the outer end of the valve stem extension 14 to prevent said plunger from becoming detached from said extension through the outer end thereof.

The signal proper is in the form of an explodable diaphragm 31, preferably of rubber, tightly fitting over the valve stem extension 14, and, as shown, is in the form of a bag having on its inner end an outturned bead 32. Incasing the bag 31, is a metallic cap 33, the inner edge of which engages the bead 32 on said bag, for a purpose that will presently appear. The cap 33 is provided with a relatively large lateral opening 34, through which said bag may be expanded, as shown in Fig. 5, and a relatively small annular opening 35, through which the head of the screw 28 may move, when the signal is given.

The explodable bag 31 normally extends between the head of the screw 28 and the opening 35 to afford a base of resistance for the plunger 25—28, which holds the spring 27 under compression. Interposed between the bag 31 and the head of the screw 28, is a displaceable spacing block 36. Formed in the valve stem extension 14, is a small escape port 37 located just above the coupling sleeve 19, to permit an escape of air from said extension, under the beaded edge of the bag 31, to the atmosphere, as will presently appear.

When applying the improved low air pressure signal to a valve stem, the explodable diaphragm 31 and its cap 33 must be removed therefrom to release the spring 27 and permit the auxiliary valve 22 to close. The application of the valve stem extension 14 to the valve stem 10 and the securing of the same thereto by the coupling sleeve 19 automatically opens the valve 12 by the engagement of the tube 17 with the expanded end of the rod 13. The explodable bag 31 is then placed within the cap 33 and both thereof telescoped over the outer end of the valve stem extension 14. During this movement of the cap 33 onto the valve stem extension 14, the edge of its open end engages the bead 32 on the bag 31, and thereby carries said bag with the cap onto the outer end of said extension. Before the explodable bag 31 and its cap 33 are placed on the valve stem extension 14, the spacing block 36 is placed within said bag. Under the telescoping movement of the bag 31 and cap 33 onto the valve stem extension 14, the plunger 25—28 is moved inward thereby which places the spring 27 under compression. The frictional engagement of the bag 31 with the valve stem extension 14 is such as to securely hold said bag in position against the tension of the spring 27.

To prevent the air in the valve stem extension 14, outward of the auxiliary valve 22, from being compressed when the bag 31 is placed on said extension, the port 37 is provided for the escape thereof. By adjusting the screw 28 in the plunger 25, the operative length of said plunger may be varied, at will, to place the spring 27 under the desired tension to open the auxiliary valve 22 against the air pressure in the tire, when said air drops below a predetermined pressure.

Obviously, the explodable bag 31 affords a base of resistance for the spring 27 through the plunger 25—28 and the spacing block 36. In case the air pressure in the tire drops below a predetermined pressure, or, in other words, when the tire becomes under-inflated, the tension of the spring 27 being greater than the air pressure in the tire, said spring will open the auxiliary valve and permit an escape of air from the tire around said valve, plunger 25, through the open outer end of the valve stem extension 14, and into the explodable bag 31. As the explodable bag 31 is confined by the cap 33, except at the opening 34, said bag will expand through said opening and finally exploded by the escaping air from the tire, and the report of the explosion of the bag will be a signal to the driver that one of the tires is under-inflated.

During the expansion of the explodable bag 31 through the opening 34 in the cap 33, said bag will draw the spacing block 36 from the head of the screw 28 to permit the bag to draw over said head, so that when the bag explodes, the same will break away from around said screw, and thereby destroy the base of resistance for the plunger 25—28 and release the spring 27. The expanding movement of the spring 27 moves the outer end of the plunger 25—28 through the opening 35 in the top of the cap 33, as shown in Fig. 6. With the spring 27 released, the air pressure in the tire immediately closes the auxiliary valve 22. It will thus be seen that only a very small amount of air from the tire is required to explode the bag 31 and thus signal the driver that one of the tires is under-inflated.

After the signal has been given, the driver may immediately pump up the under-inflated tire, or replace the same with a spare tire, or, if the distance is not too great, he may drive to the nearest garage. When the tire is again inflated, the cap 33 is removed, together with the remaining fragment of the exploded bag 31, and a new bag substituted therefor. The signal may then be replaced on the valve stem, as previously described.

By the use of the improved low air pressure signal, a driver need never run on a tire, when under-inflated, thus preventing rim cuts, blow-outs, and the working of the several layers of the tire upon each other, which, as is well known, greatly reduces the mileage of a tire and adds greatly to the tire expense of a car.

The weight of the auxiliary valve 22 and its rod 23 is such that when a vehicle is running fast, centrifugal force will open said valve sooner than the same would be opened when the vehicle is running slower. This, of course, is very desirable, as it permits a driver to slow up before a blow-out or other injury to a tire takes place, which may cause an accident.

In the modification shown in Fig. 7, the auxiliary valve 22 is dispensed with and the valve 12 used in place of cutting the same out of action, as in the construction shown in Figs. 1 to 6, inclusive. The washer 16 is also dispensed with and the diameter of the tube 17 made somewhat larger. To open the valve 12, when the tire becomes under-inflated, the rod 13 thereof is provided with an extension 38, having at its inner end a head 39 which rests on the expanded end of said rod 13 and works within the tube 17 and is guided thereby. The spring 27 is compressed between the head 39 and the shoulder 26. The action of this form of signal is just the same as that of the signal previously described.

The expression "compressed air" is herein used in a broad sense to cover compressed gas or steam.

What I claim is:

1. The combination with the valve stem of an air chamber, of a valve in the valve stem normally held closed by air pressure in the chamber, a diaphragm normally closing the valve stem to the atmosphere, and a spring having its base of resistance maintained by the diaphragm and under strain to open the valve when the air in said chamber drops below a predetermined pressure, said diaphragm adapted to be exploded by air pressure escaping through the valve stem when the spring opens the valve, the exploding of the diaphragm destroying the base of resistance for the spring and permitting the valve to be closed by the air pressure in the chamber.

2. The combination with the valve stem of an air chamber, of a valve in the valve stem normally held closed by air pressure in the chamber, a diaphragm normally closing the valve stem to the atmosphere, a spring having its base of resistance maintained by the diaphragm and under strain to open the valve when the air in said chamber drops below a predetermined pressure, said diaphragm adapted to be exploded by air pressure escaping through the valve stem when the spring opens the valve, the exploding of the diaphragm destroying the base of resistance for the spring and permitting the valve to be closed by the air pressure in the chamber, and a displaceable spacing block interposed between the spring and its base of resistance and arranged to be displaced by the exploding of the diaphragm.

3. The combination with the valve stem of an air chamber, of a cap on the valve stem and having an air escape opening, a diaphragm at the opening in the cap and normally closing the valve stem to the atmosphere, a valve in the valve stem normally held closed by air pressure in said chamber, and a spring having its base of resistance maintained by the diaphragm and under strain to open the valve when the air in said chamber drops below a predetermined pressure, said diaphragm adapted to be exploded by air pressure escaping through the valve stem when the spring opens the valve, the exploding of the diaphragm destroying the base of resistance for the spring and permitting the valve to be closed by the air pressure in the chamber.

4. The combination with the valve stem of an air chamber and a valve in said stem arranged to be closed by the air pressure in said chamber, of an extension applied to the valve stem and holding said valve open, an auxiliary valve in said extension and normally held closed by the air pressure in said chamber, an explodable bag on said extension and closing the same to the atmosphere, a cap covering the bag and having an opening through which said bag may be expanded, a longitudinally adjustable plunger in said extension, a spring compressed between the auxiliary valve and plunger for opening said auxiliary valve when the air in said chamber drops below a predetermined pressure, and a second opening in the cap over which said bag extends as a base of resistance for the plunger, said bag adapted to be exploded by air pressure escaping through the valve stem and its extension when the spring opens the auxiliary valve, the exploding of the bag destroying the base of resistance for the plunger and permitting the same to move through the second opening in the cap to render said spring inoperative and permit the auxiliary valve to be closed by the air pressure in the chamber.

5. The combination with the valve stem of an air chamber, of a cap on the valve stem and having an air escape opening, a diaphragm at the opening in the cap and normally closing the valve stem to the atmosphere, a valve in the valve stem normally held closed by air pressure in said chamber, a spring having its base of resistance maintained by the diaphragm and under strain to open the valve when the air in said chamber drops below a predetermined pressure, said diaphragm adapted to be exploded by air pressure escaping through the valve stem when the spring opens the valve, the exploding of the diaphragm destroying the base of resistance for the spring and permitting the valve to be closed by the air pressure in the chamber, and an air escape port in the valve stem.

In testimony whereof I affix my signature in presence of two witnesses.

DAVID D. GETMAN.

Witnesses:
CLARE DEMAREST,
HARRY D. KILGORE.